US012596835B2

(12) United States Patent
Ye

(10) Patent No.: US 12,596,835 B2
(45) Date of Patent: Apr. 7, 2026

(54) PERSONAL FEATURE INFORMATION SECURITY ASSURANCE SYSTEM

(71) Applicant: Chunlin Ye, Yiwu (CN)

(72) Inventor: Chunlin Ye, Yiwu (CN)

( * ) Notice: Subject to any disclaimer, the term of this patent is extended or adjusted under 35 U.S.C. 154(b) by 249 days.

(21) Appl. No.: 18/252,252

(22) PCT Filed: Oct. 29, 2021

(86) PCT No.: PCT/CN2021/127468
§ 371 (c)(1),
(2) Date: May 9, 2023

(87) PCT Pub. No.: WO2023/070531
PCT Pub. Date: May 4, 2023

(65) Prior Publication Data
US 2024/0012935 A1 Jan. 11, 2024

(51) Int. Cl.
*H04L 9/32* (2006.01)
*G06F 21/32* (2013.01)
*G06F 21/62* (2013.01)

(52) U.S. Cl.
CPC .............................. *G06F 21/6245* (2013.01)

(58) Field of Classification Search
None
See application file for complete search history.

(56) References Cited

U.S. PATENT DOCUMENTS

| | | | | |
|---|---|---|---|---|
| 10,693,872 | B1 * | 6/2020 | Larson | G06F 21/32 |
| 2014/0258009 | A1 | 9/2014 | Alshobaki et al. | |
| 2017/0293763 | A1 * | 10/2017 | Shear | G06F 21/31 |
| 2017/0366542 | A1 * | 12/2017 | Milgramm | G06F 21/606 |
| 2018/0300364 | A1 * | 10/2018 | Xu | G06Q 20/3276 |
| 2022/0270426 | A1 * | 8/2022 | Seenivasagam | H04L 9/50 |

FOREIGN PATENT DOCUMENTS

| | | | | |
|---|---|---|---|---|
| CN | 110222482 A | | 9/2019 | |
| CN | 110957025 A | * | 4/2020 | G06F 21/64 |
| CN | 111859463 A | * | 10/2020 | G06F 21/71 |
| CN | 112364375 A | | 2/2021 | |
| CN | 112788067 A | | 5/2021 | |
| CN | 113032710 A | | 6/2021 | |
| KR | 102139548 B1 | * | 7/2020 | G06V 40/16 |
| TW | M591664 U | * | 3/2020 | |

OTHER PUBLICATIONS

International search report of PCT/CN2021/127468.

* cited by examiner

*Primary Examiner* — Christopher B Robinson
(74) *Attorney, Agent, or Firm* — Tutunjian & Bitetto, P.C.

(57) ABSTRACT

Provided is a personal feature information security assurance system which includes a personal information acquiring and verifying apparatus, a service management platform, and a centralized supervision and management platform. The personal information acquiring and verifying apparatus is configured to introduce structural settings increasing, decreasing or varying graphics and modify parameter conditions in acquired information, or determine combinations of different changes to information to express different situations and actual requirements. Verification codes of the subject person and the management platform are set to allow the person to autonomously add factor conditions. The acquiring and verifying apparatus is further configured to upload obtained information through a secret channel, the supervision and management platform performs re-checking and verification and process anomalies in a targeted manner, or the acquiring and verifying apparatus is configured to need to confirm the identity of an operation manager and confirm authorization, supervision and management.

9 Claims, No Drawings

PERSONAL FEATURE INFORMATION SECURITY ASSURANCE SYSTEM

TECHNICAL FIELD

The present disclosure relates to the field of personal information security, and particularly relates to a personal feature information security assurance system.

BACKGROUND

Currently, as is known to all, with development and progress of society and science and technology, various networking products have increasingly become an indispensable part of people's life and work, thereby bringing great convenience to the people. However, with continuous in-depth integration of informatization and economic society, personal information is more widely collected and used. Although China has stepped up great efforts to strengthen the protection of personal information in recent years, there are many prominent problems of personal information security in real life, such as random collection, illegal acquisition, excessive use, illegal trading of personal information, the use of personal information to intrude on the people's peace of life, to endanger the people's life, health and property safety. These problems need to be handled and tackled seriously and effectively.

SUMMARY

In order to solve the above problems, the present disclosure provides a reasonable, simple and feasible personal feature information security assurance system.

In order to achieve the above purpose, the present disclosure provides a following technical solution: a personal feature information security assurance system, which is composed of a personal feature information acquiring and verifying apparatus, a service management platform and a centralized supervision and management platform; based on the prior art of verification for access to personal feature information, structural settings are introduced to the acquiring and verifying apparatus for increasing, decreasing or varying graphics and modifying parameter conditions in the acquired information determined by an information subject himself/herself and the service management platform, or combinations of difference changes in information are determined to express different situations and actual requirements, standardized supervision is implemented by the centralized supervision and management platform, and anomalies are handled in a timely manner, so that the personal information security is assured in an active and variable verification mode, and the purpose of personal information security can be tangibly achieved even if the personal feature information is stolen or lost;

further, the verification code for confirmation of the information subject himself/herself and the service management platform is set in a structural form in which the information subject himself/herself can add factors and conditions independently, so that the security and reliability of the verification link are enhanced, and coerced potential safety hazards can be effectively avoided and eliminated; and further, the acquiring and verifying apparatus is set in a structural form in which the acquired information cannot be intercepted, and anomalies are checked and verified by the supervision platform and handled in a targeted and coordinated manner, or the acquiring and verifying apparatus is set in a structural form through which that the identity information and authorized supervision of the operation manager need to be confirmed, so that the reliability and security are improved in a multi-layer linked manner.

The acquiring and verifying apparatus is a device for acquiring and verifying personal feature information, including an acquisition and verification system containing a human biometric information acquiring and verifying apparatus; the service management platform is a service and management platform for the acquiring and verifying apparatus; the centralized supervision and management platform is a functional supervision platform related to the acquiring and verifying apparatus, including relevant functional departments; the factors and conditions are settings and conditions that play a decisive role, enable the use of textual, digital or graphic marks, and any combinations thereof, according to the agreement, so that different situations and actual requirements can be reflected in a real-time manner by setting up the confirmation for authorization independently of increasing different sequences or replacing elements thereof, defects in passive verification code are avoided and potential security hazards in the prior art are eliminated.

Preferably, an information structural setting determined by the information subject himself/herself and the service management platform can express different situations and specific requirements in a single structure of increasing, decreasing or varying graphics and modifying parameter conditions in the acquired information.

Preferably, the information structural setting determined by the information subject himself/herself and the service management platform can express different situations and specific requirements in a form of different combinations by changing the single structure of the acquired information.

Preferably, the information structural setting determined by the information subject himself/herself and the service management platform can be changed in the acquired information or can be set by increasing characters and watermarks to express different situations and specific requirements.

Preferably, the information structural setting determined by the information subject himself/herself and the service management platform is set up in a way that structural forms with different changes in the acquired information can be automatically increased or decreased according to a preset or the structure can be alternately changed, so that wrongdoers have no way to commit illegal behaviors.

Preferably, various structural forms with different changes in the acquired information can be applied to the verification code for confirmation of the information subject himself/herself and the service management platform, so as to discover and solve problems and enhance security and reliability in a timely manner.

Preferably, the acquiring and verifying apparatus is set in a structural form that can be opened only after authorized verification, and in case of any non-compliant operation, an alarm will be given and such non-compliant operation will be handled in a timely manner.

Preferably, a human biometric sensor is arranged on the acquiring and verifying apparatus to confirm whether the identity information of a user is consistent with the authorized identification information. In case of any inconsistency, an alarm will be given and such inconsistency will be handled in a timely manner.

Preferably, the acquiring and verifying apparatus is connected to the nearby monitoring device or self-equipped monitoring device, and is set to activate the acquiring and verifying apparatus, that is, triggering the monitoring, so as to ensure that the identity of a user is consistent with the authorized information. In case of any anomaly, an alarm will be given and such anomaly will be handled in a timely manner.

The present disclosure provides a reasonable, simple, practical and feasible structure setting, and adopts various character marks based on individual preferences of an information subject and in compliance with national regulations, so that original unique personal feature information is expressed in independent, flexible, almost unlimited structural forms, and wrongdoers have no way to commit illegal behaviors. The overall solution provides a loop of multiple enhancement insurance from many aspects, can be implemented step by step or in one step according to actual requirements, and can achieve the purpose of assuring personal information security reliably event if the personal biometric information is stolen or lost. Given assuring the security tangibly, various forms of change in the acquired information in the present disclosure can be arranged in different specific change point positions in a distinguishing manner to express actual intention and needs of the information subject himself/herself without leaving any traces, so that coerced potential safety hazards can be effectively avoided and eliminated. Integrating the present disclosure into the existing social security management and control system can give full play to the role of advantageous resources in all aspects, and further improve the overall effect of the present disclosure.

The present disclosure has the following beneficial effects: with a simple, reasonable and feasible structural form, the present disclosure starts from key points to solve the problems, can effectively prevent the leakage of personal information, and can achieve the purpose of assuring personal information security reliably event if the personal biometric information is stolen or lost.

DETAILED DESCRIPTIONS OF THE EMBODIMENTS

The present disclosure provides a personal feature information security assurance system, which is further described below.

Example: a personal feature information security assurance system, which is composed of a personal feature information acquiring and verifying apparatus (such as a client, specially includes a face recognition device), a service management platform (such as one server or multiple servers) and a centralized supervision and management platform (such as one server or multiple servers); based on the prior art of verification for access to personal feature information, structural settings are introduced to the acquiring and verifying apparatus for increasing, decreasing or varying graphics and modifying parameter conditions in the acquired information determined by an information subject himself/herself and the service management platform, or combinations of difference changes in information are determined to express different situations and actual requirements, standardized supervision is implemented by the centralized supervision and management platform, and anomalies are handled in a timely manner, so that the personal information security is assured in an active and variable verification mode, and the purpose of personal information security can be tangibly achieved even if the personal feature information is stolen or lost; further, the verification code for confirmation of the information subject himself/herself and the service management platform is set in a structural form in which the information subject himself/herself can add factors and conditions independently, so that the security and reliability of the verification link are enhanced, and coerced potential safety hazards can be effectively avoided and eliminated; and further, the acquiring and verifying apparatus is set in a structural form in which the acquired information cannot be intercepted, and anomalies are checked and verified by the supervision platform and handled in a targeted and coordinated manner, or the acquiring and verifying apparatus is set in a structural form through which that the identity information and authorized supervision of the operation manager need to be confirmed, so that the reliability and security are improved in a multi-layer linked manner. The acquiring and verifying apparatus is a device for acquiring and verifying personal feature information, including an acquisition and verification system containing a human biometric information acquiring and verifying apparatus; the service management platform is a service and management platform for the acquiring and verifying apparatus; the centralized supervision and management platform is a functional supervision platform related to the acquiring and verifying apparatus, including relevant functional departments; the factors and conditions are settings and conditions that play a decisive role, enable the use of textual, digital or graphic marks, and any combinations thereof, according to the agreement, so that different situations and actual requirements can be reflected in a real-time manner by setting up the confirmation for authorization independently of increasing different sequences or replacing elements thereof, defects in passive verification code are avoided and potential security hazards in the prior art are eliminated. Each of the preferred solutions in the present disclosure can be flexibly selected or combined in specific implementation, and only indicates that the present disclosure is flexible about changing the information determined at will with maximum autonomy. In specific implementation, the information structural setting determined by the information subject himself/herself and the service management platform "can express different situations and specific requirements in a single structure of increasing, decreasing or varying graphics and modifying parameter conditions in the acquired information", "can express different situations and specific requirements in a form of different combinations by changing the single structure of the acquired information" or "can be changed in the acquired information or can be set by increasing characters and watermarks to express different situations and specific requirements", which are expressed in a more intuitive way and will not cause incomprehension in the setting. The information structural setting determined by the information subject himself/herself and the service management platform "can be set up in a way that structural forms with different changes in the acquired information can be automatically increased or decreased according to a preset or the structure can be alternately changed, so that wrongdoers have no way to commit illegal behaviors", which means that the above structural forms with different changes can be set to be regular or interspersed with irregular changes, for example, selected eye, nose and mouth parts in face recognition are numbered 1, 2 and 3 respectively, which can be set to increase or decrease every other day or according to a set number of days, or the original numbers are changed to be 2, 3 or 6, 1, or the like, after the set number of days, and the structural forms can be changed in the form of interpolation or rotation. In fact, it is not necessarily to select three numbers, introducing a few points or changing the parts of graphics can also effectively assure security of personal information; for identity feature information marked by digital symbols, selecting various information transformation and combination forms in the present disclosure can also achieve the purpose of effectively assuring the security; for the structure of "various structural forms with different changes in the acquired information can be applied to the verification code for confirmation of the information subject himself/herself and the service management platform, so as to discover and solve problems and enhance security and reliability in a timely manner", it has the functional effect same as that of the aforesaid structures, and can add a reliable security line of defense to the solution, which has the effect of avoiding possible hazards; and for the structures of "the acquiring and verifying apparatus is set in a structural form that can be opened only after authorized verification, and in case of any non-compliant operation, an alarm will be given and such non-compliant operation will be handled in a timely manner", "a human biometric sensor is arranged on the acquiring and verifying apparatus to confirm whether the identity information of a user is consistent with the authorized identification information. In case of any inconsistency, an alarm will be given and such inconsistency will be handled in a timely manner" and "the acquiring and verifying apparatus is connected to the nearby monitoring device or self-equipped monitoring device, and is set to activate the acquiring and verifying apparatus, that is, triggering the monitoring, so as to ensure that the identity of a user is consistent with the authorized information. In case of any anomaly, an alarm will be given and such anomaly will be handled in a timely manner", all of the structures can further escort the reliability and security assurance of the overall solution of the present disclosure.

Apparently, those skilled in the art may make various modifications and variations to the structural arrangement of the present disclosure without departing from the spirit and scope of the present disclosure. Therefore, if these modifications fall within the technical scope of the claims of the present disclosure and their equivalents, the present disclosure is also intended to include these modifications.

What is claimed is:

1. A personal feature information security assurance system, comprising:
   a personal feature information acquiring and verifying apparatus including a face recognition device;
   a service management platform configured to be a service and management platform for the acquiring and verifying apparatus, and
   a centralized supervision and management platform, the service management platform and centralized supervision and management platform are one or more servers, the centralized supervision and management platform is configured to implement standardized supervision and handle anomalies in a timely manner;
   wherein the personal feature information acquiring and verifying apparatus is configured to, based on the prior art of verification for access to personal feature information, introduce structural settings for increasing, decreasing or varying graphics and modifying parameter conditions in the acquired information determined by an information subject himself or herself and the service management platform, or determine combinations of difference changes in information to express different situations and actual requirements,
   wherein a verification code for confirmation of the information subject himself or herself and the service management platform is set in a structural form in which the information subject himself or herself can add factors and conditions independently; and
   wherein the acquiring and verifying apparatus is set in a structural form in which the acquired information cannot be intercepted, and anomalies are checked and verified by the supervision platform and handled in a targeted and coordinated manner, or the acquiring and verifying apparatus is set in a structural form through which that the identity information and authorized supervision of the operation manager need to be confirmed.

2. The personal feature information security assurance system according to claim 1, wherein an information structural setting determined by the information subject himself or herself and the service management platform can express different situations and specific requirements in a single structure of increasing, decreasing or varying graphics and modifying parameter conditions in the acquired information.

3. The personal feature information security assurance system according to claim 1, wherein the information structural setting determined by the information subject himself or herself and the service management platform can express different situations and specific requirements in a form of different combinations by changing the single structure of the acquired information.

4. The personal feature information security assurance system according to claim 1, wherein the information structural setting determined by the information subject himself or herself and the service management platform can be changed in the acquired information or can be set by increasing characters and watermarks to express different situations and specific requirements.

5. The personal feature information security assurance system according to claim 1, wherein the information structural setting determined by the information subject himself or herself and the service management platform is configured such that structural forms with different changes in the acquired information can be automatically increased or decreased according to a preset or the structure can be alternately changed.

6. The personal feature information security assurance system according to claim 1, wherein various structural forms with different changes in the acquired information can be applied to the verification code for confirmation of the information subject himself or herself and the service management platform.

7. The personal feature information security assurance system according to claim 1, wherein the acquiring and verifying apparatus is set in a structural form that can be opened only after authorized verification.

8. The personal feature information security assurance system according to claim 1, further comprising a human biometric sensor is-arranged on the acquiring and verifying apparatus to confirm whether the identity information of a user is consistent with the authorized identification information.

9. The personal feature information security assurance system according to claim 1, wherein the acquiring and verifying apparatus is connected to a nearby monitoring device or a self-equipped monitoring device, and is set to activate the acquiring and verifying apparatus, that is by triggering the monitoring, so as to ensure that the identity of a user is consistent with the authorized information.

* * * * *